United States Patent [19]

Jannborg et al.

[11] Patent Number: 4,655,676
[45] Date of Patent: Apr. 7, 1987

[54] ROBOT INSTALLATION

[75] Inventors: Björn Jannborg; Mats Lundström, both of Västerås, Sweden

[73] Assignee: ASEA Aktiebolag, Västerås, Sweden

[21] Appl. No.: 629,481

[22] Filed: Jul. 10, 1984

[30] Foreign Application Priority Data

Jul. 11, 1983 [SE] Sweden ................................ 8303930

[51] Int. Cl.⁴ .............................................. B25J 9/06
[52] U.S. Cl. ..................... 414/736; 29/792; 408/35; 408/46; 901/31; 414/730; 414/739; 414/226
[58] Field of Search ............... 414/736, 222, 223, 225, 414/226, 733, 734, 735, 738, 739, 740, 741; 901/31; 408/35, 46; 29/809, 429, 430, 568, 792; 294/87.1, 88

[56] References Cited

U.S. PATENT DOCUMENTS

| 883,942 | 4/1908 | Evans | 408/46 X |
|---|---|---|---|
| 1,835,539 | 12/1931 | Thomas | 408/46 |
| 3,134,276 | 5/1964 | Abrams | 408/35 X |
| 4,062,455 | 12/1977 | Flatau | 414/738 X |
| 4,205,427 | 6/1980 | Koch et al. | 414/738 X |
| 4,346,514 | 8/1982 | Makizawa et al. | 414/752 X |
| 4,355,446 | 10/1982 | Shimajiri et al. | 408/35 X |
| 4,462,748 | 7/1984 | Inaba et al. | 414/736 X |
| 4,486,928 | 12/1984 | Tucuer et al. | 414/744 A X |

Primary Examiner—Frank E. Werner
Attorney, Agent, or Firm—Watson, Cole, Grindle & Watson

[57] ABSTRACT

A robot installation for performing a plurality of assembling or machining operations at a work or assembly station comprises a robot with a rotatable tool support, e.g. a ring or disc, carrying a number of tools. The turning and positioning of the tool support are controlled by control equipment of the robot. The tools are adjustably positioned on the tool support.

7 Claims, 6 Drawing Figures

4,655,676

ROBOT INSTALLATION

BACKGROUND OF THE INVENTION

1. Field of the Invention

This invention relates to a robot installation for performing a plurality of operations, e.g., for assembling a plurality of preferably differently shaped parts in a product or for machining a part or parts with a plurality of different tools and/or in several steps.

During the assembly of a plurality of parts of a product at an assembly station with the aid of a robot, the picking up of parts from a magazine and the transportation of the parts to the assembly station may involve long and time-consuming movements for the robot. These very transporting movements may influence or determine the rate of production of the product since the actual fitting of the parts into an assembly fixture or into other parts at the assembly station may be carried out comparatively rapidly. If, in addition, the majority of the parts to be assembled are so different that they require special grippers, it is necessary to provide one robot or one robot arm for each individual part to be handled. Alternatively, when machining parts with a plurality of different tools, the time required for tool relacement may considerably exceed the actual time required for machining and thus will also influence or determine the rate of production of the machined products.

2. Description of the Prior Art

U.S. patent application Ser. No. 492,652 filed May 9, 1983 by Berg Favot (now abandoned) shows and describes a robot installation in which a robot assembles several parts of a product at the same assembly station. In this known robot installation the movements of the robot during the assembly of a plurality of parts are small, and the assembly of these product parts can be carried out in rapid succession. This improved utilization of the robot in the known robot installation has been achieved by providing the robot with a turret which is indexable and lockable in a number of fixed positions, the turret supporting a number of grippers adapted to handle different parts to be assembled at the assembly station in question. In this known robot installation there are a number of conveyor belts or magazines having feeding devices for feeding forward parts to the operating range of the robot. The known robot is provided with an arm and the turret is connected to the arm by a turnable wrist, the axis of rotation of the turret making an angle, e.g. 45°, with the axis of rotation of the wrist. The grippers may be positioned on the turret in such a way that, in one position of the turret, the axis of rotation of the wrist and a symmetry axis or symmetry plane of a gripper are parallel. This facilitates assembly of a product in that only small lifting movements and horizontal transporting movements are required during the actual assembly operation. The number of grippers on the turret may vary; the number of grippers usually being three, four or six. The magazines may be of several different kinds. Magazines for parts which are not symmetrical are suitably of a kind having pallets with guide means for fixing the parts in a certain pattern for orientation of the parts in a definite way so that they may be picked up by the grippers. The known robot installation may include one or more robots and may be completed with other assembly devices, for example machines for inserting and tightening screws.

SUMMARY OF THE INVENTION

This invention relates to a further development of the known robot installation mentioned above.

According to the invention, a robot installation includes an assembly or machining station, in which either a plurality of parts are assembled into a product or a part is machined in a number of steps by a number of different tools. Gripping tools for parts to be assembled or machining tools for different machining operations are positioned on a rotatable tool support which may be set in different angular positions. A characteristic of the invention is that the rotatable supporting member consists of a ring or disc around which a number of the tools may be positioned in arbitrary angular positions, the rotation and positioning of the ring or disc in a desired angular position being controlled by control equipment of the robot. The ring or disc and tools or tool holders for the tools are formed so that the tools or the tool holders may be displaced circumferentially on the ring or disc to desired angular positions and may then be locked in the set positions. The ring or disc may, for example, be formed with a dovetailed guide means and the tool or the holder with a slot adapted to the guide means. The tool or the holders are conveniently provided with locking devices to enable them to be fixed in desired angular positions after circumferential displacement.

The invention permits a stepless setting of the tools around the supporting member, which makes it possible to adapt the setting with respect to the size and shape of the tools or the parts. This results in greater flexibility and greater freedom in the construction of an assembly or machining station.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
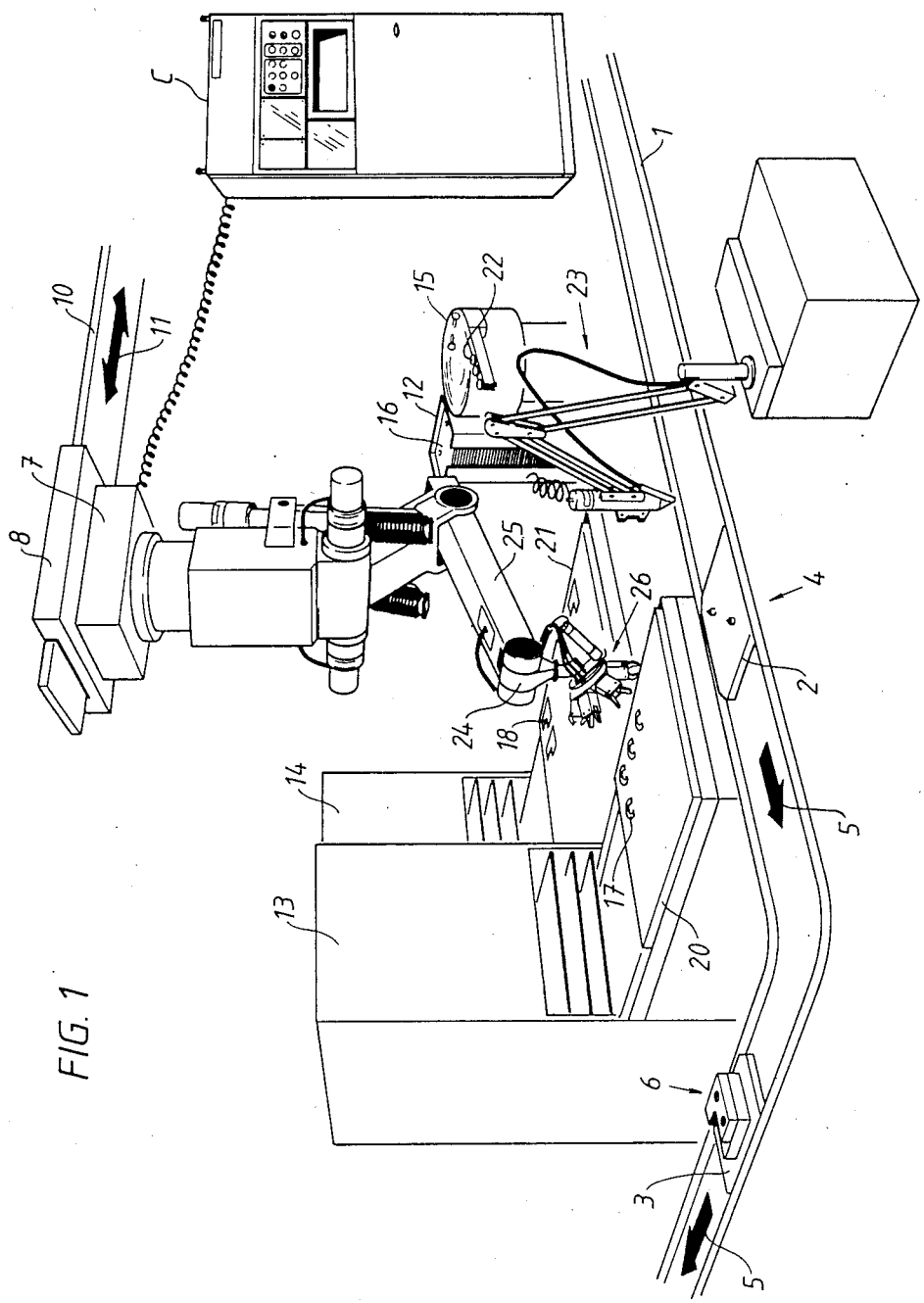
FIG. 1 is a perspective view of a robot installation according to the invention.

FIG. 1 shows a robot installation according to the invention comprising an assembly line or track 1 for stepwise displacement of assembly fixtures 2 and 3 to and from a work or assembly station 4. In FIG. 1, fixture 2 is empty and is positioned at the assembly station 4 and the direction of movement of the fixtures is indicated by the arrows 5. Fixture 3 is shown supporting an assembled product 6 and is being transported away from the assembly station 4. A robot 7 is suspended from a carriage 8 which runs on an overhead track 10 in the directions indicated by the arrows 11 and is controlled by a control unit C. In this way, the robot 7 has a large operating range.

Adjacent the assembly station 4 are arranged magazines 12, 13, 14 and 15 for the parts which are to be included in the assembled product 6. Magazine 12 contains a stack of bottom plates 16, and magazines 13 and 14 contain parts 17 and cover plates 18, respectively, positioned and fixed in a predetermined pattern on cassettes 20 and 21, respectively, belonging to the magazines 13 and 14, respectively. Magazine 15 is a vibrating feeding device for screws 22 or other similar parts. In front of the assembly station 4 there is positioned a screw feeder and screw driving device 23.

The robot 7 includes a wrist 24 (see FIG. 2) on an outer arm 25, the wrist 24 supporting a turret 26 carrying grippers 27 adapted for gripping the parts 16, 17, 18 and 22. The turret 26 comprises a fixed disc 28 which is attached to a flange 30 of the wrist 24 by means of a rod 31. A further disc 32 is rotatably mounted on the disc 28 for rotation about a turning axis, the disc 32 carrying the grippers 27. The axis of rotation of the disc 32 makes an angle of 45° with the axis of rotation of the wrist 24. The turret 26 is formed and positioned in such a way that the symmetry axis of any one of the grippers 27, when the disc 32 is rotated into a position associated with that gripper, coincides or is parallel with the axis of rotation of the wrist 24. On the disc 28 there is mounted an attachment 33 for a drive device 34 for the positioning of the disc 32 as well as connections for operating conduits 35, 36 and 37, for example for supplying compressed air for operation of the grippers 27 and for locking of the disc 32 of the turret 26 in its different positions. Channels (not shown) are provided in the discs 28 and 32 for transmission of working fluid for the operation of the grippers 27.

Figure 3:
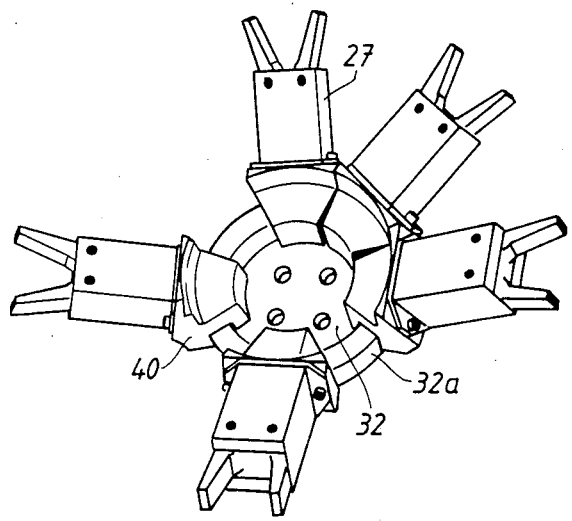
FIG. 3 is a perspective view, on an enlarged scale, of a disc included in the turret shown in FIG. 2, the disc constituting a holder for enabling circumferential displacement of tools attached thereto.

As shown more clearly in FIG. 3, the disc 32 is formed with an annular supporting or tool-mounting portion 32a which carries attachments 40 for mounting the grippers 27. The attachments 40 are circumferentially displaceable on the annular supporting portion 32a so that they may be positioned at desired distances from each other and be secured in their chosen positions. Individual alignment of the grippers 27 can be achieved by adjustment of the gripper mounting on supporting surfaces of the attachments 40 or by providing some form of adapter (not shown) between the attachment 40 and the gripper 27.

The robot installation shown in FIGS. 1 to 3 operates as follows, with the control unit C controlling the operation of the robot 7. As a fixture 3 with an assembled product 6 is being transported away from the assembly station 4 and is replaced by a new empty fixture 2, the robot 7 collects a bottom plate 16 from the magazine 12, two parts 17 from the pallet 20 of the magazine 13, a cover plate 18 from the pallet 21 of the magazine 14 and two screws 22 or the like from the magazine 15. The turret 26 with its parts is moved to the assembly station 4 where the parts are assembled. The parts can be placed on the fixture 2 in rapid succession since the robot only has to carry out small movements during the assembly operation. Because a number of parts are stored in the grippers 27 of the turret 26, the turret 26 need only be lifted a small distance and possibly also be displaced a small distance for the assembly of a new part. By turning or indexing the disc 32, a new part is fed forward to a suitable assembly position. With an embodiment where the symmetry line or symmetry plane of a gripper coincides with the axis of rotation of the wrist, in certain cases only the turret need be lifted for indexing and thereafter be lowered for assembly of the next part. The movements are insignificant and the parts in the grippers of the turret can be assembled in rapid succession. After the parts of the robot 7 have been placed on the fixture, screws may be inserted and tightened by means of the automatic screw driving device 23 at the assembly station 4.

Figure 4:
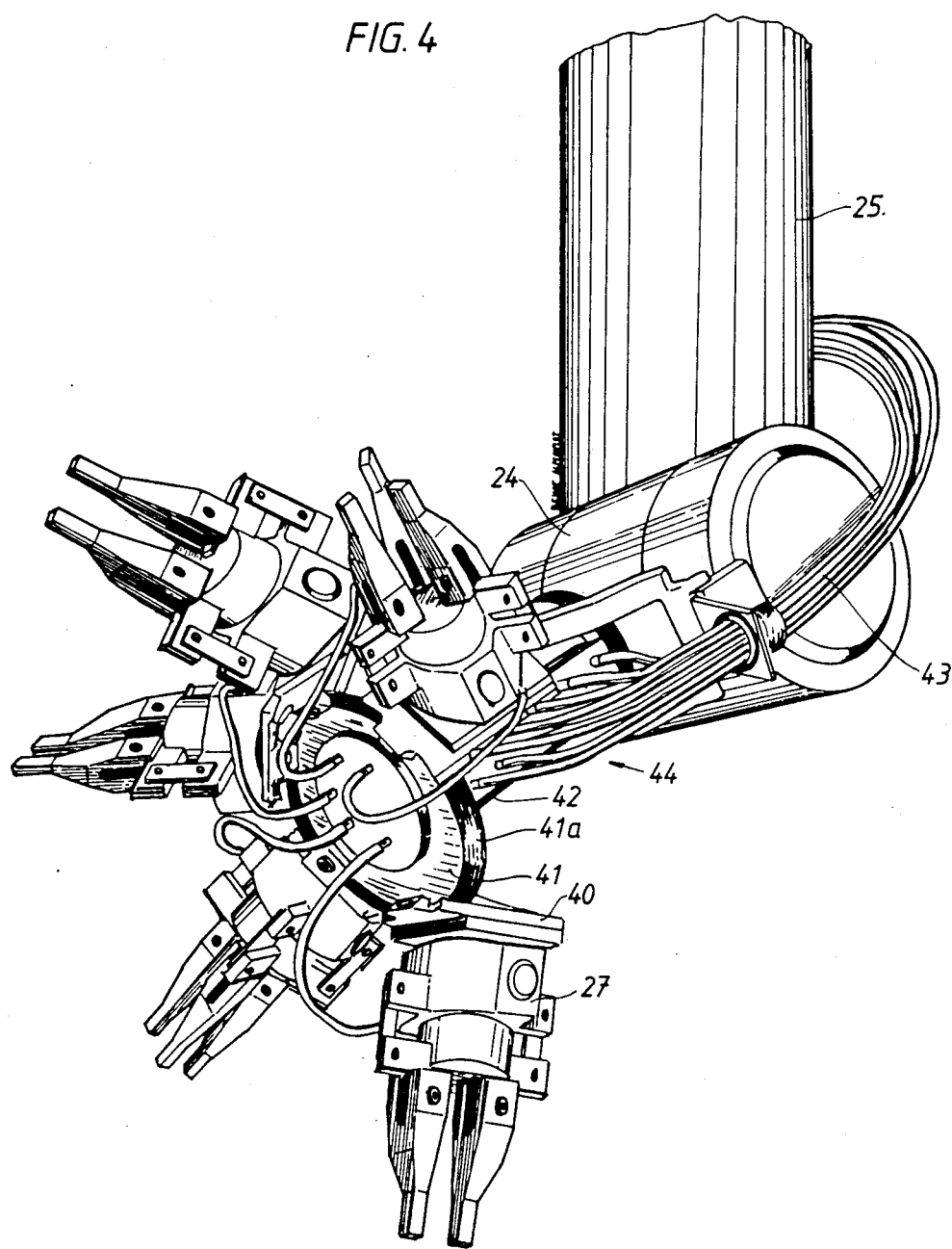
FIG. 4 is a perspective view, on an enlarged scale, of an alternative embodiment for mounting tools on a tool support carried by a robot arm.

FIG. 4 shows an alternative embodiment for mounting grippers 27 or other tools at the end of a robot arm 25. In particular, FIG. 4 shows a disc 41, corresponding to the disc 32 of the turret 26, journalled on a shaft (not shown) in a tubular sleeve 42 which is fixedly joined to a wrist 24. The disc 41 is formed with a supporting portion 41a, e.g., of annular form corresponding to supporting portion 32a, on which fixing attachments 40 for grippers 27 are mounted, the attachments 40 being displaced circumferentially for each desired angular position. The axis of rotation of the disc 41 and the tubular sleeve 42 are coaxial. By way of the shaft (not shown) in the sleeve 42, the disc 41 is connected to the output rotating shaft of the wrist and is operated to the desired angular position by means of one of the drive motors of the robots. The sleeve 42 and the noted shaft form a swivel unit 44 for transmitting pressure medium for operating the tools 27. The sleeve 42 is connected to a pressure medium source via the bundle of conduits 43 via a valve unit.

Figure 2:
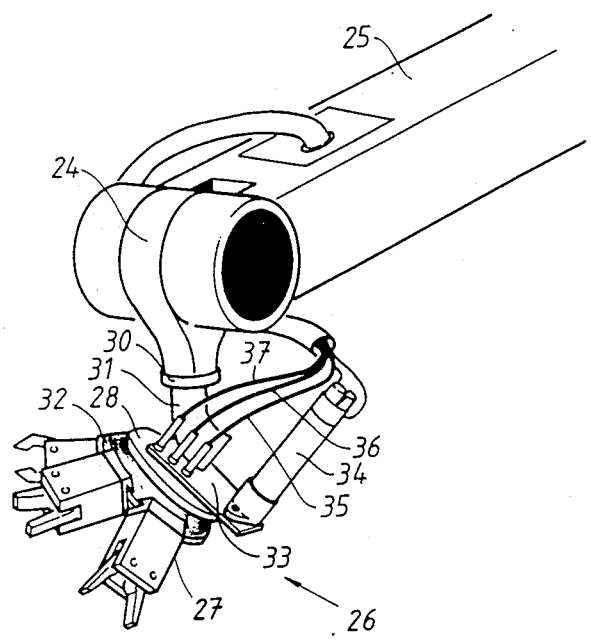
FIG. 2 is a perspective view, on an enlarged scale, of the outer part of a robot arm of the installation shown in FIG. 1, the robot arm supporting at its outer end a rotatable turret mounting gripper devices.

The robot installation according to FIG. 4 operates in a substantially similar manner to that described with respect to the robot installation of FIGS. 1 to 3.

The tools or grippers 27 may be slidably mounted on the annular portion 28a or 32a in any convenient manner, For example, the annular portion may have a dovetail section and the attachments 40 may have a slot of similar section in which the annular portion is slidably received. Screw means may be provided for locking each attachment 40 in its desired angular position on the annular portion 28a or 32a.

The embodiments of the invention specifically described above are examples only and many modifications may be made thereto within the scope of the ensuing claims. For example the invention has been described above specifically with respect to the assembly of a product. However, the invention can be adapted to the machining of a product in several stages. In this latter case the grippers 27 could be replaced by machining tools.

Figure 5:
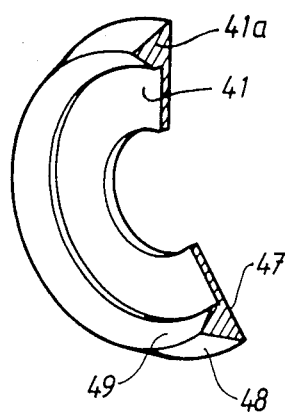
FIG. 5 is a perspective view of an annular tool support, partly in section.
Figure 6:
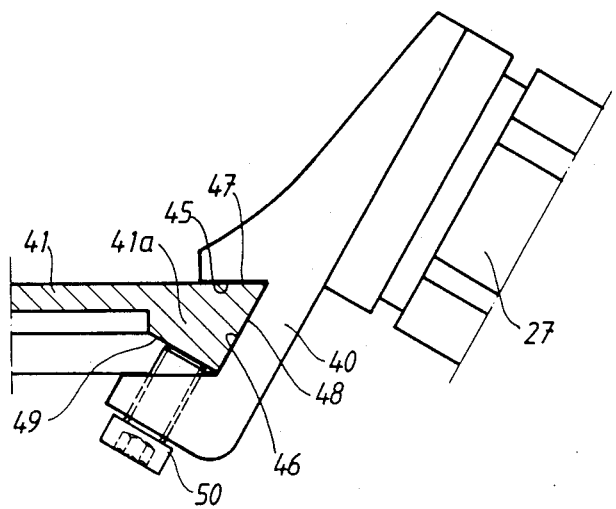
FIG. 6 is a section of the tool support and a view of a tool fixed to the tool support.

In FIG. 5 there is shown in more detail one embodiment of a disc 41 and its outer annular dovetail part 41a. The tool attachment member 40 can suitably be formed to straddle the dovetail part 41a of the disc 41 and have two surfaces 45 and 46 formed to cooperate with one surface 47 of the dovetail part 41a and with the outer circumferential surface 48 of said dovetail part 41a. Fixing screws 50 in the tool attachment member 40 cooperate with the other side surface 49 of the dovetail part 41a, thereby clamping the attachment member 40 upon the disc 41.

What is claimed is:

1. In a robot installation for producing a product from a plurality of different parts by accomplishing a plurality of operations, said robot installation including means forming a product assembly station; a plurality of supply means for supplying a plurality of different parts to different locations near said product assembly station, and a robot for performing said plurality of operations at said product assembly station, said robot including an articulated arm system having an outer arm terminating at a free end, a wrist means having a first rotational axis therethrough rotatably mounted on the free end of said outer arm, a turret head support means mounted on said wrist means, a turret head mounted on said turret head support means to be rotatable about a second rotational axis, a plurality of tools attached to said turret head, rotation means mounted on said turret head support means for rotating said turret head with respect to said turret head support means and around said second rotational axis, such that each of said plurality of tools can be rotated into an operative position, and control means connected to said articulated arm system to control the operation of said rotation means, the improvement wherein said turrent head comprises a disc having an enlarged annular periphery; wherein each of said plurality of tools includes an attachment means which is mountable on said enlarged annular periphery of said disc and when desired can be manually moved therealong to allow each respective tool to be manually positioned at a desired location around its circumference, each attachment means including locking means which is cooperable with said disc to fixedly position each respective tool around the circumference of said enlarged annular periphery; and wherein said rotation means can rotate said turret head to any arbitrary rotational position relative to said turret head support means.

2. The robot installation as defined in claim 1, wherein each of said tools comprise a gripper.

3. The robot installation as defined in claim 2, including a plurality of conduits connected to said turret head support means for supplying compressed air to said turret head to operate the gripper of each tool attached thereto.

4. The robot installation as defined in claim 1, wherein said second rotational axis intersects said first rotational axis at an angle of about 45°.

5. The robot installation as defined in claim 1, wherein each tool is symmetrical about a line of symmetry and wherein the line of symmetry of each said tool is parallel with said first rotational axis when in its operative position.

6. The robot installation as defined in claim 5, wherein the line of symmetry of each said tool coincides with said first rotational axis when in its operative position.

7. The robot installation as defined in claim 5, wherein said turret head support means comprises a tubular sleeve.

* * * * *